United States Patent [19]

Scuilli

[11] 4,404,598
[45] Sep. 13, 1983

[54] COPYING AND ENGRAVING APPARATUS

[76] Inventor: Henry G. Scuilli, 98-618C Kaonohi St., Aiea, Hi. 96701

[21] Appl. No.: 223,545

[22] Filed: Jan. 9, 1981

[51] Int. Cl.³ .............................................. H04N 1/22
[52] U.S. Cl. .................................. 358/296; 358/289; 358/291; 346/139 D
[58] Field of Search .............. 358/293, 296, 297, 298, 358/299, 289, 291, 292; 346/139 D, 139 B; 82/14 R, 14 A, 14 B, 14 C, 18

[56] References Cited

U.S. PATENT DOCUMENTS

| | | | |
|---|---|---|---|
| 2,301,024 | 11/1942 | D'Humy et al. | 358/298 X |
| 2,925,464 | 2/1960 | Raible | 358/299 |
| 3,262,647 | 7/1966 | Harrison | 82/14 R |
| 3,646,262 | 2/1972 | Moe | 358/298 X |
| 3,716,668 | 2/1973 | Barron | 358/299 |
| 3,937,873 | 2/1976 | Gastineau | 358/297 |
| 4,268,869 | 5/1981 | Heyer et al. | 358/293 |

*Primary Examiner*—Bernard Konick
*Assistant Examiner*—Donald McElheny, Jr.
*Attorney, Agent, or Firm*—James Creighton Wray

[57] ABSTRACT

In an engraving machine a scanning head on the carriage is positioned adjacent a reader drum, and an opposite cutter head is positioned adjacent an engraving drum. The scanning head is movable sideways so that test runs may be conducted along the side of a plate mounted on the engraving drum. The engraving drum and the scanning drum have clamps to hold a photograph and the engraving plate. As the scanning head senses a particular shade of the photograph or article being copied, the cutting head is moved toward the engraving drum to engrave the plate on the drum to a particular degree. Both drums rotate together, and the carriage is intermittently stepped along the drums by the lead screw. Two ground parallel bars support a carriage on three Nylatron sliders, each of which has three Nylatron shoes. A lead screw operated by a DC motor is connected to the carriage by centrally mounted split half nuts.

24 Claims, 13 Drawing Figures

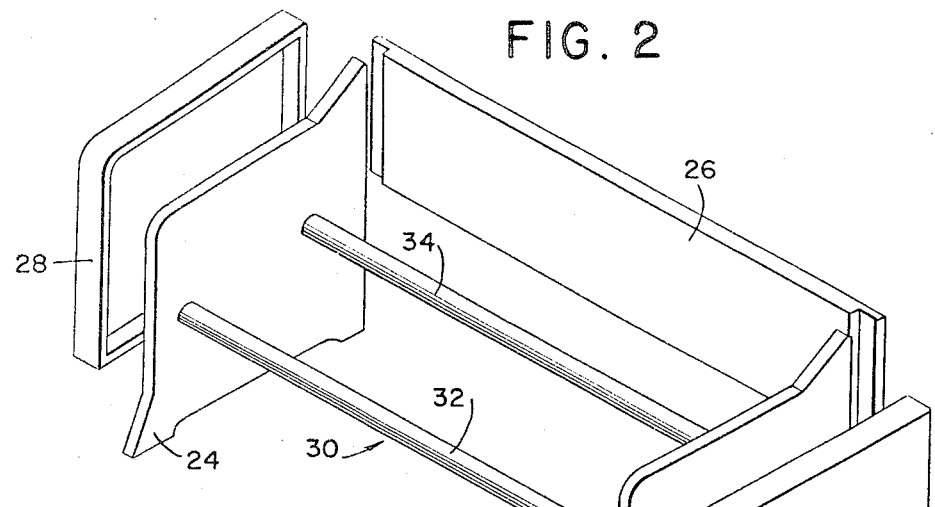
FIG. 2
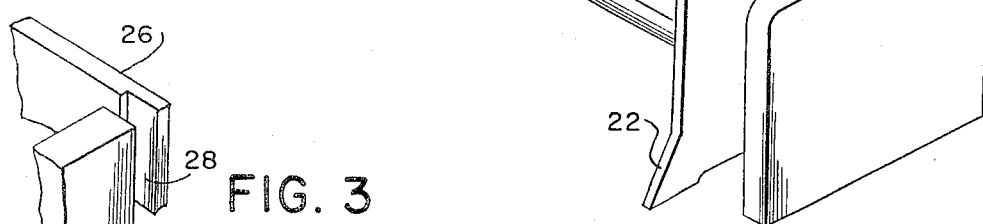
FIG. 3
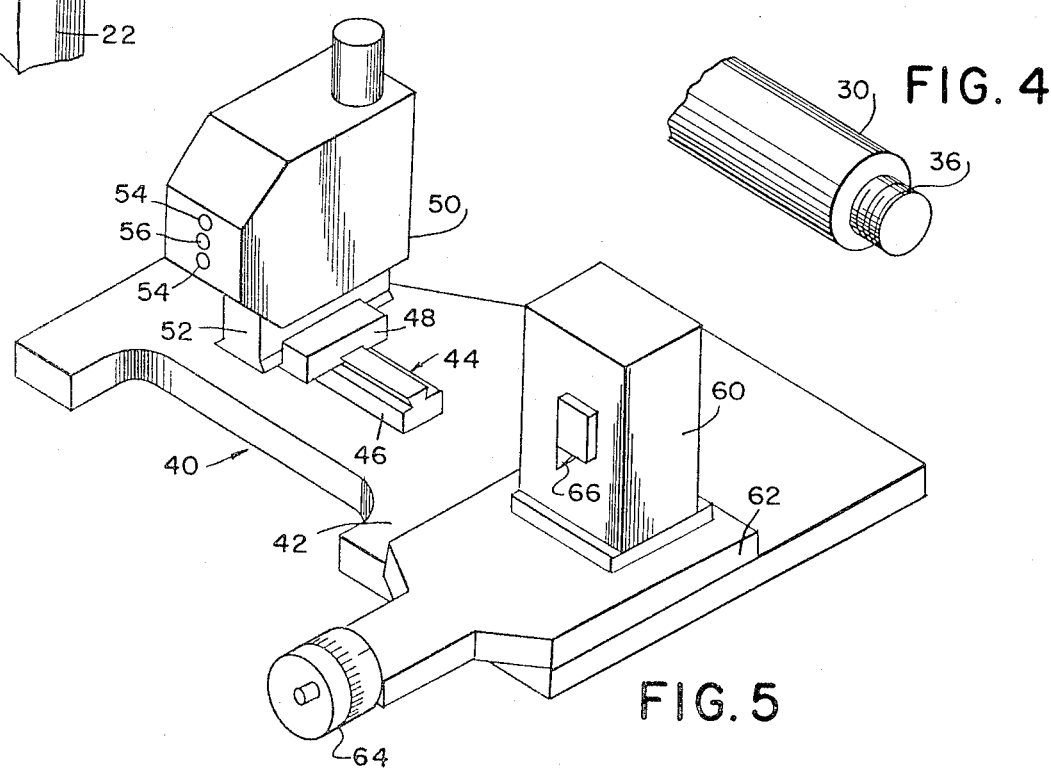
FIG. 4
FIG. 5

COPYING AND ENGRAVING APPARATUS

BACKGROUND OF THE INVENTION

Prior art engraving machines are heavy and costly devices. Moreover, other prior art devices have problems of momentum and backlash cutter bounce and other problems which are avoided in the present invention.

One example of prior art photoengravers is found in U.S. Pat. No. 3,372,618. There a heavy and expensive lathe bed is used in a complicated system.

U.S. Pat. No. 3,429,207 is an example of a photoelectric follower and a cutter mounted on the same carriage. The pattern does not rotate.

U.S. Pat. No. 3,425,303 is an example of a pattern follower and cutter mounted on the same carriage. The pattern tape moves, but does not rotate in the same way as the spindle which is being cut.

U.S. Pat. No. 3,246,548 describes a photoelectric follower on the same carriage as a cutter.

Austrian Pat. No. 212,665 is an example of a template and workpiece mounted on separate parallel spindles and with a follower and cutter mounted on a single carriage adjacent the spindles.

SUMMARY OF THE INVENTION

This invention relates to a lightweight portable electronic engraving machine capable of producing metallic or other engravings from photographs or other original material. The machine uses a single carriage riding on Nylatron surfaces across two ground parallel bars supported rigidly by end plates. Its unique construction eliminates the costly and extremely heavy lathe bed configuration of other units. This construction reduces weight by 80% and physical size by 75%.

A single carriage accurately traverses a precision lead screw led by a double half nut assembly which eliminates the need for costly thrust bearing units in current use.

Power drive for the lightweight portable electronic engraving machine is supplied by a 1/20 horsepower motor with infinitely variable operating speeds. This system is far superior to present models using ¼ to ⅓ horsepower motors and pulleys and "V" belt arrangements allowing only four available speeds.

The use of a heavy, bulky, expensive lathe bed as used on other similar equipment is eliminated by utilizing two ground polished hardened steel bars with Nylatron riders for a smooth end to end transaction.

The lead screw for carriage transport is threaded and carefully matched to a spring loaded split nut. The thread angle-nut angle match is such that with spring loading of the independent split nut half, lateral motion of the carriage is impossible when the lead screw is stopped.

The scanning sensor can be aligned from 0 to 4 inches to the left of the cutter head due to the single carriage and precision dove tail scan sensor mounting. This allows the operator to make test strips on the left margin of the engraving plate while scanning any portion of the first 4 inches of the left hand margin of the work.

A scan select lever allows the operator to select the number of lines per inch of engraving. The carriage moves in precise steps. The machine produces 76.8, 98, 128, 192, 384, lines per inch. All the operator has to do is move the scan select lever to the desired number of lines per inch. Present machines now being sold require the use of allen wrenches for adjustment. The operator must loosen a set crew and slide a ratchet to select a precise number of teeth on a large wheel. If he does not properly set the dog, the existing machines produce uneven number of lines per inch.

The lead screw for carriage transport is threaded and carefully matched to a spring loaded split half nut. The thread angle-nut angle match is such that with spring loading of the independent split nut half, lateral motion of the carriage is impossible when the lead screw is stopped.

Three Nylatron sliders are used to support the carriage on the two parallel bars. The Nylatron sliders are constructed with three Nylatron shoes, two are located on the top half and one is spring loaded in the center of the lower half. The wear character of Nylatron is superb with metal.

The operation of this lightweight portable electronic engraving machine is as follows:

A piece of work to be copied by engraving is securely affixed to the scan drum.

A metal engraving plate, or a plate of other material, is securely affixed to the engraving drum.

With the carriage return handle, the carriage holding the scan sensor and the cutting head is moved to the left hand margin of the plate. The scan sensor is then aligned with the left margin of the work.

The operator selects the drum rotation speed, control current, and scans per inch from the controls on the control panel.

The power drive knob is engaged, causing both the scan drum and the engraving drum to turn.

The carriage cross feed is adjusted to bring the cutter forward until desired depth of the cut is obtained. The engraver is now in operation.

OBJECTS OF THE INVENTION

One object of the invention is the provision of a copying apparatus having a mount with a first mounting clamp for mounting an article to be copied, and a second mounting clamp for mounting an object to be changed, and having a scanner mounted adjacent the first mounting for scanning the article, and a changer mounted adjacent the second mounting for changing the object, the apparatus having adjusters connected to the scanner and changer means for adjusting relative positions of the scanner and changer, a motor for moving the mount with respect to the scanner and changer, and a stepping device for stepping the scanner and changer with respect to the mount.

Another object of this invention is the provision of a copying apparatus with a drum for mounting a photograph and an engraving plate, a motor connected to the drum for turning the drum with respect to a scanner and a changer.

A further object of this invention is the provision of a copying apparatus having an elongated guide and a carriage mounted on the guide and scanning and changing and adjusting devices mounted on the carriage, and stepping means connected to the carriage and for stepping the carriage along the guide.

Another object of this invention is the provision of a copying apparatus having a lead screw connected to a carriage and periodic means connected to the lead screw for periodically turning the lead screw, first and second mounting means on a drum for mounting a subject and a copy, a motor connected to the drum for turning the drum and a ratchet means connected to the motor and to the lead screw for periodically turning the lead screw and advancing the carriage in relation to the turning of the drum.

Another object of this invention is the provision of an apparatus with first and second relatively transversely oriented slides mounted on the carriage means and scanning and changing means respectively mounted on the slides for relocatable movement.

A further object of this invention is the provision of a copying apparatus with first and second ground round parallel bars and a carriage having three sliders connected to the bars, two sliders being connected to one bar, and one slider being connected to the other bar.

A further object of this invention is the provision of sliders which have first and second blocks having complementary semi-cylindrical openings therethrough for together forming a cylindrical opening, means on the first block for connecting the block to a body of a carriage, the semicylindrical openings having recesses therein for receiving slider shoes of friction reducing material having inward projecting concave surfaces complementary to bars, wherein a lower most recess has a spring mounted between the block and the shoe for urging shoe toward the bar.

Another object of this invention is the provision of an apparatus wherein the carriage means comprises a body, slides for mounting the body on elongated guides and a split nut having one half connected to the body and one half remote from the body and a connector for joining the halves in tight fitting non-backlash relationship with the lead screw.

A further object of this invention is the provision of split half nuts which have first and second blocks with complementary semi-cylindrical openings and means for joining the blocks together, the blocks having threads extending through the combined semi-circular openings and having portions of interfaces between the blocks removed after threading, and the joining means including springs for urging the blocks together when the blocks are assembled on the lead screw.

Another object of this invention is the provision of a unitary copying drum having first and second longitudinal halves which respectively have a first mount and a second mount and wherein the first half has a clamp for receiving a photograph and the second half has a clamp for holding an engraving plate.

A further object of this invention is the provision of clamps which have first and second bars having forms to engage a plate, pivots, for mounting the bars at a medial portion of a drum, and interconnected gears at opposite ends of the bars adjacent one end of the drum, a gear sector connected to one of the gears and having teeth at a surface thereof remote from the gear and a worm mounted on the drum connected to the teeth for moving the gear sector and thereby turning the gears to move the plate holding bars into fixed engagement with the plate, whereby the plate is held firmly on the drum.

Another object of this invention is the provision of a toothed pulley mounted on a drive shaft of a motor, a second toothed pulley connected to a copying drum, a toothed drive belt connecting the first and second toothed pulleys, an eccentric mounted on the drive shaft of the motor, an eccentric follower mounted on the eccentric, pawl and ratchet means connected to the eccentric follower, a pawl holdout cam connected to the pawl and ratchet means, and a scan select lever connected to the holdout cam for selectively holding out the pawl to control the movement of stepping means connected to the ratchet in relation to rotation of the drum.

A further object of this invention is the provision of a cutter for engraving an object, a shaft connected to the cutter and a solenoid connected to the shaft for moving the shaft and the cutter means toward the object to be engraved.

Another object of the invention is the provision of an engraving apparatus with a drum having a photograph holder and an engraving plate holder, and elongated guide parallel to the drum, a carriage mounted on the guide, a lead screw mounted parallel to the guide and connected to the carriage for moving the carriage upon turning of the lead screw, a motor connected to the drum for turning the drum, a ratchet connected to the motor and connected to the lead screw for stepping the lead screw and carriage upon turning of the drum, a scanning sensor head mounted on the carriage and first adjustment means mounted between the scan sensor head and the carriage, a cutter head mounted on the carriage, second adjusting means mounted between the cutter head and the carriage for selectively moving the cutter head toward the drum, a shaft mounted in the cutter half for reciprocation toward the drum, solenoid means connected to the shaft and the cutter head for driving the shaft toward the drum, and a cutter blade mounted on an end of the shaft adjacent the drum for engraving a plate on the drum when the shaft is moved toward the drum by the solenoid.

A further object of this invention is the provision of an apparatus described with a stepping adjustment lever connected to the ratchet for adjusting the ratchet to vary the turning of the lead screw and the advancing of the carriage in relation to revolutions of the drum.

Another object of this invention is the provision of an apparatus with a base having first and second opposite end plates and a third plate interconnecting the end plates and elongated first and second parallel guide bars interconnecting the end plates and together with the back plate holding the base in rigid condition.

A further object of this invention is the provision of the apparatus as described with a shaft and bearings in the first and second plates and a drum fixed on the shaft, a motor and ratchet means connected to the first end plate and a lead screw supported in bearings in the first and second end plates.

Another object of this invention is the provision of elongated first and second ground parallel guide bars mounted on a base and a carriage having three sliders connected to the bars, two sliders being connected to one bar, and one slider being connected to the other bar.

A further object of this invention is the provision of slider blocks having complementary semi-cylindrical openings therethrough for together forming a cylindrical opening, the semi-cylindrical openings having recesses therein for receiving slider shoes of friction reducing material having inward projecting concave surfaces complementary to bars on which they slide.

Further objects and features of the invention are apparent in the disclosure which includes the above and on going description and the drawings and claims.

BRIEF DESCRIPTION OF THE DRAWINGS

FIG. 2 is a view of the base and guide bars for the portable engraving machine.

FIGS. 3 and 4 are details of the rigid interfit between parts of the base.

FIG. 5 is a perspective view of the carriage which includes the scanning head and cutting head and adjusting devices.

DETAILED DESCRIPTION OF THE DRAWINGS

Figure 1:
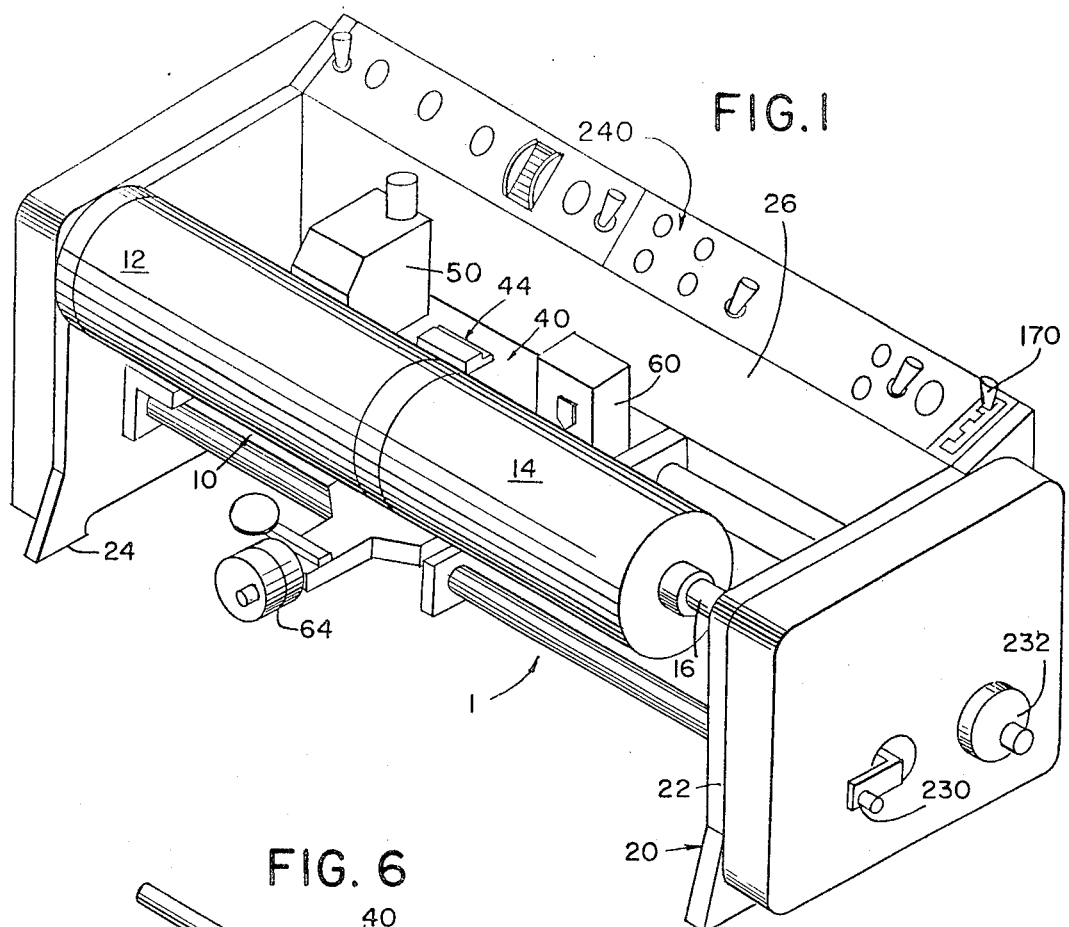
FIG. 1 is a perspective view of an engraving machine of the present invention.

Referring to FIG. 1, a copying apparatus which is a light weight portable electronic engraving machine capable of producing metallic or other engravings from photographs or other original material is generally indicated by the numeral 1. The machine has a mounting drum 10 with a first mounting means 12 for receiving a photograph.

A second mounting means 14 mounts an object to be changed by the copying process, namely an engraving plate. A shaft 16 is supported in bearings and end plates 22 and 24.

A base, generally indicated by the numeral 20 includes the vertically oriented parallel end plates 22 and 24 and a rear plate 26 which is joined in a tight fitting rabbited connection as shown in the details of FIGS. 2 and 3. Wooden bells 28 are provided for the ends of the end plates. Elongated guides 30 in the form of ground round bars 32 and 34 have threaded ends 36 which turn into tapped holes in end plates 22 and 24 and hold the base in further rigidity.

A carriage generally indicated by the numeral 40 and showing further detail in FIG. 5 is mounted on the guide bars 30. The carriage has a platform 42 and a first adjusting means 44 which has a slide 46 extending in the direction of the guide bars 30. A second guide 48 is keyed to the first guide for sliding along the first guide.

A scanning head 50 has a downward projection 52 keyed to the second guide 48 for sliding in the second guide transverse to the first guide 46. Set screws hold the scanning head 50 in the desired adjusted position after the guides have been slid to the proper relationship. The scanning head 50 has lamps which project light through windows 54. The light is reflected from the subject being copied on mount 12 into window 56.

A cutting head 60 is mounted on a carriage on a second adjusting means 62 which is moved inward and outward by a vernier control 64. The cutting head 60 has a cutting point 66 which moves outward toward the engraving plate mounted on mount 14 to cut the engraving plate in patterns controlled by the photocell. The cutter head changes the engraving plate so that the engraving plate takes the appearance of the photograph which is being copied.

Figure 6:
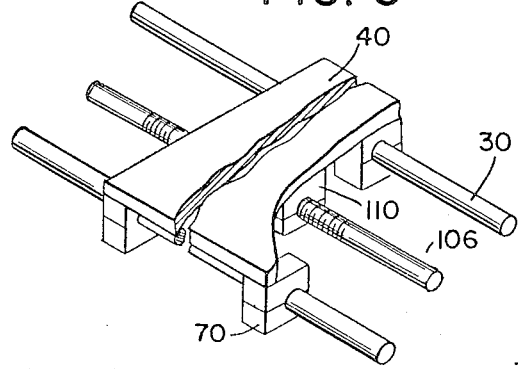
FIG. 6 is a schematic view of the carriage suspension and drive.

As shown in FIG. 6, carriage 40 is mounted on guide bars 30 with slider blocks 70.

Figure 7:
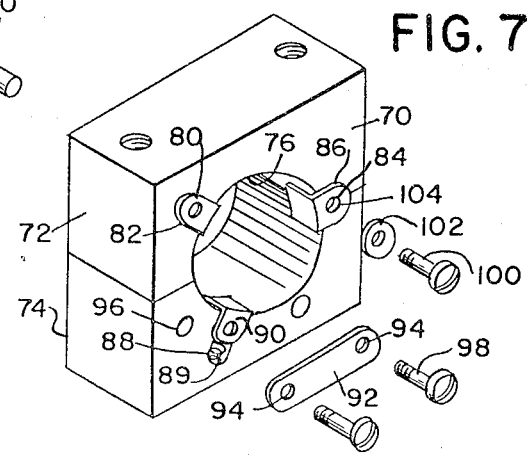
FIG. 7 is a detail of the carriage slider blocks.

As shown in FIG. 7, the slider blocks are constructed with upper and lower halves 72 and 74 with complementary semi-circular bores 76 which together form cylindrical openings for receiving the guide bars 30. Three slider blocks support carriage 40 on the guide bars 30. Two slider blocks are mounted on front bar 32 and one slider block is mounted on the rear bar 34.

Shoes 80 made of low friction plastic material such as Nylatron are placed in recesses 82 of the slider blocks. One shoe 84 is placed in complementary recesses 86 in the upper and lower slider blocks. Recess 88 in the lower slider block is deepened, and a spring 89 is inserted in the recess to urge the shoe 90 upward toward the guide bar. A retaining plate 92 has two holes 94 which fit tapped holes 96 in the lower slider blocks so that bolts 98 may be inserted to retain spring 89 and shoe 90 in recess 88. Bolts 100 pass through washers 102 and holes 104 in shoes 80 to secure the upper two shoes in the recesses.

Figure 8:
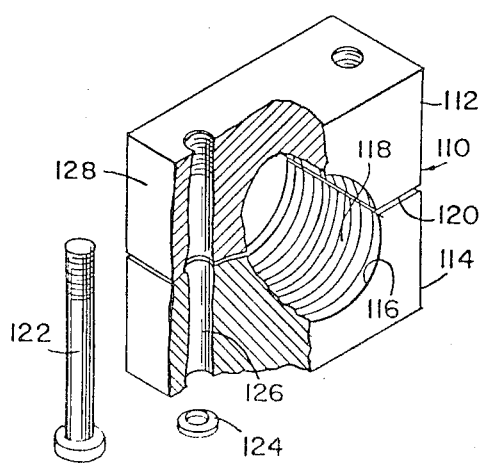
FIG. 8 is a detail of the split nut which is connected to the feed screw.

As shown in FIGS. 6 and 8, carriage 40 is driven by a lead scrw 106 along bars 30. Lead screw 106 is connected to the carriage by threaded half nuts 110. The half nuts 110 as shown in FIG. 8 comprise upper and lower halves 112 and 114.

A central bore 116 is tapped 118. After tapping the bore, the halves are disassembled and the interfaces 120 are ground or cut so that material is removed therefrom. Bolts 122 are inserted through spring washers 124 and holes 126 and threaded into upper tapped holes 128, with the spring washers urging the upper and lower halves together in tight fit on lead screw 106.

Figure 9:
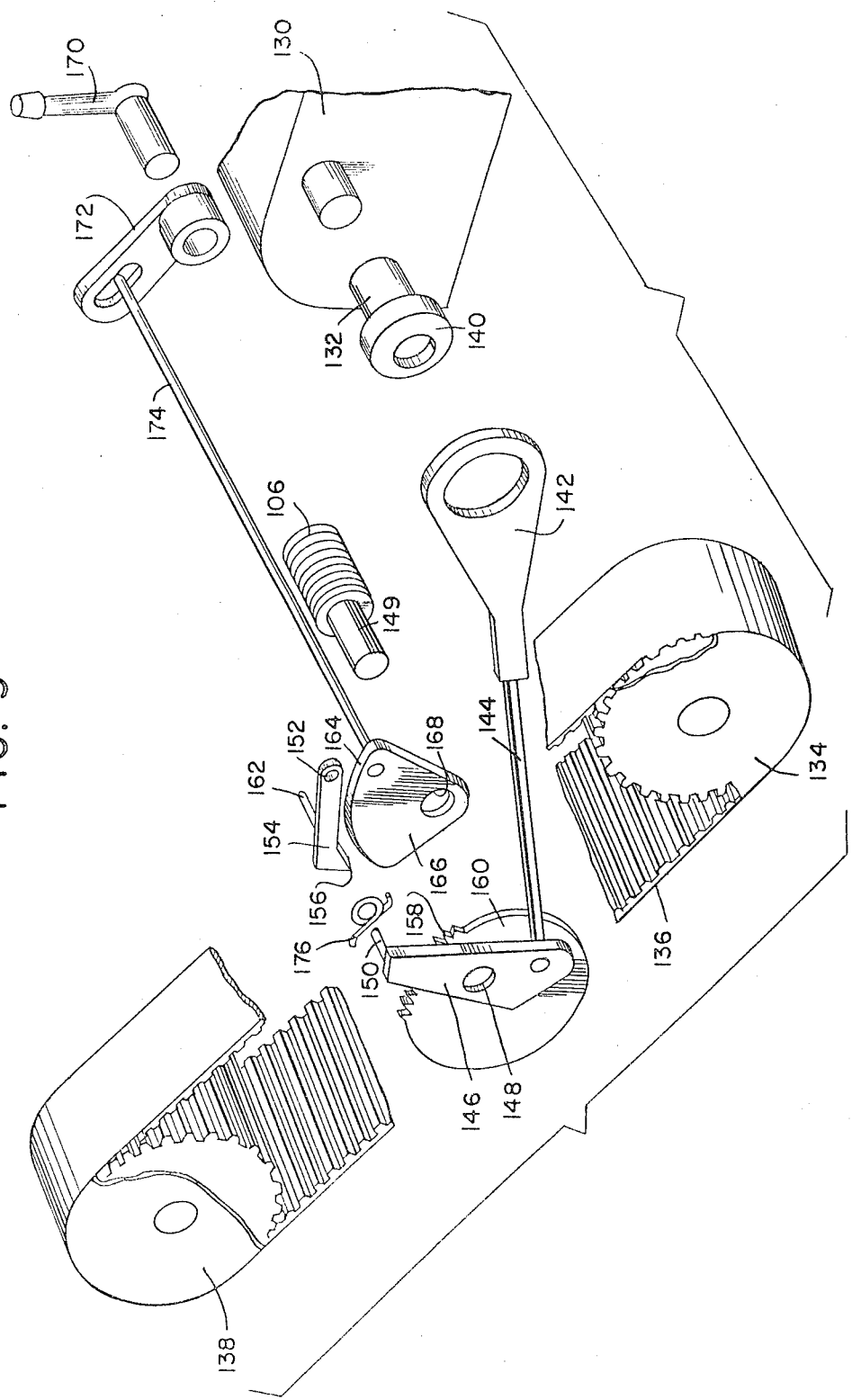
FIG. 9 is a detail of the drum and carriage drive apparatus.

As shown in the schematic representation of FIG. 9, a drive motor 130 has a drive shaft 132 which is connected to a toothed pulley 134. A toothed drive belt 136 connects pulley 134 with a second toothed pulley 138 which is connected to the shaft 16 of the drum 10. An eccentric 140 is mounted on the distal end of drive shaft 132, and an eccentric follower 142 pushes and pulls rod 144 as the eccentric 140 oscillates the follower 142. Pawl ratchet drive arm 146 has a central opening 148 for loosely mounting on the extended end 149 of lead screw 106. A pawl mounting pin 150 extends from the upper end of the drive arm 146 through an opening 152 in pawl 154. Tip 156 of pawl 154 engages teeth 158 of the ratchet wheel 160. The ratchet drive wheel 160 is keyed to end 149 of lead screw 106 so that the oscillating drive arm 146 and the pawl 156 steps the wheel and lead screw in a counter clockwise direction as shown in FIG. 9. Pawl holdout pin 162 rides on the cam surface 164 of pawl holdout cam 166. A hole 168 through the cam 166 is loosely mounted on the extended shaft 149 of lead screw 106. Scan select lever 170 is keyed to arm 172 and link 174 to turn cam 166. Spring 176 holds the pawl downward with tip 156 tending to engage teeth 158 and holdout pin 162 tending to engage the upper surface 164 of the scan select lever. The scan select lever is turned to lift pawl 154 and allows the pawl to pick 0, 1, 2, 3, 4, or 5 teeth on the ratchet drive wheel for each oscillation.

Upon one revolution of shaft 132 from reduction gearing in drive motor 130 the drum is turned one turn and the lead screw is stepped by the desired number of ratchet teeth so that the scanner scans and the cutter cuts stepped portions of the photograph and the engraving plate.

Figure 10:
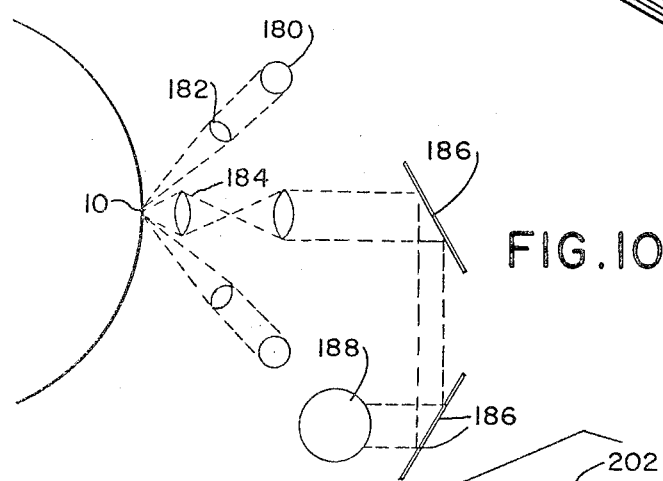
FIG. 10 is a schematic detail of the scanning arrangement.
Figure 11:
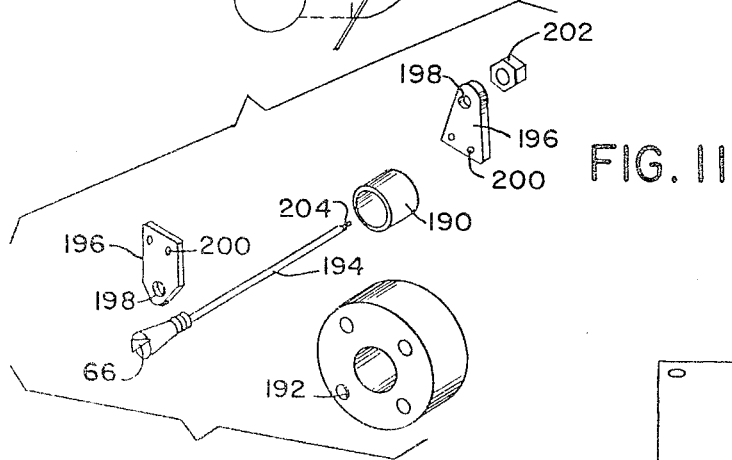
FIG. 11 is a detail of parts of the cutter head.

As shown in the schematic of FIG. 10, lamps 180 project through lenses 182 onto the surface of the scan drum 10. Light is reflected from the object to be copied on the surface of the drum through lenses 184. Mirrors 186 direct the light to a photomultiplier tube 188 which senses the light or darkness qualities of the subject. An amplified signal is conducted from photomultiplier tube to an electric coil 190 shown in FIG. 11. The coil and the magnet 192 drive shaft 194 outwards toward drum 10 so that cutter tip 66 cuts a pattern on the engraving plate on the drum. Forward and rearward spring steel shaft holders 196 have openings 198 for receiving the shaft 194. Holes 200 are provided in the holders 196 for mounting the holders on the block of the cutter head. A nut 202 is connected to a threaded end 204 of the shaft after it passes through hole 198 in the rear spring shaft holder. The solenoid which includes the electric coil 190 and the magnet 192 upon being energized forces the shaft 194 and cutter tip 66 toward the drum, with a force that varies according to the desired depth of cut as controlled by the center head. Spring steel shaft holders 196 tend to resist the outward movement and return the shaft rearward when the electric coil 190 is de-energized or when its energy is reduced sufficiently not to overcome the force of the spring steel shaft holders.

Either the magnet 192 or the electric coil 190 may be mounted on the shaft while the other is held stationary within the cutter head. In one form of the invention, magnet 192 is held stationary within the cutter head and the electric coil 190 is secured to the cutter shaft 194 to move therewith.

Figure 12:
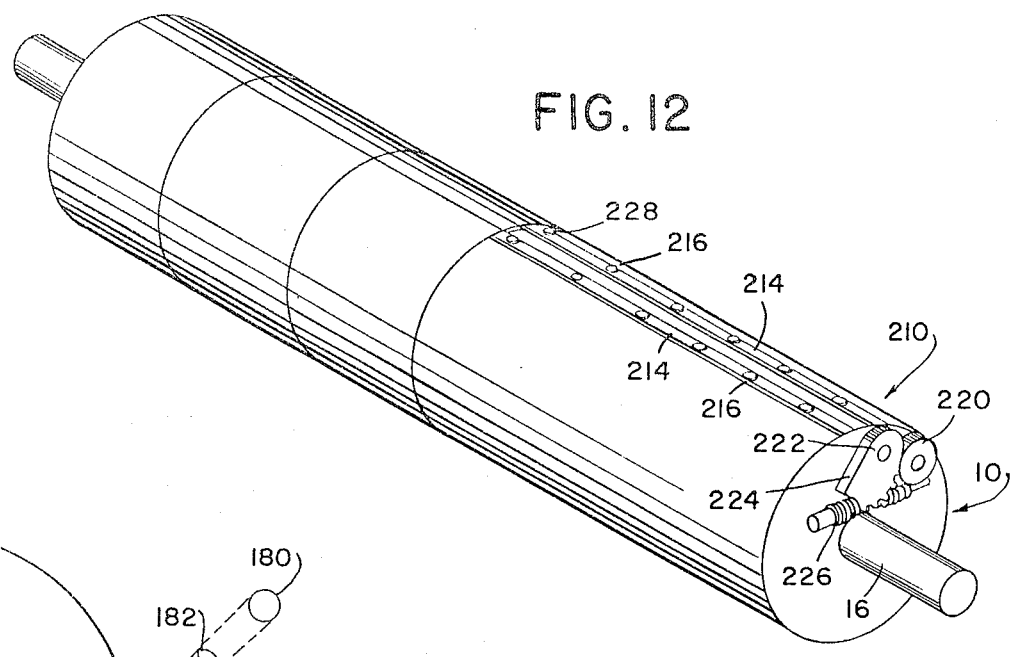
FIG. 12 is a detail of the drum showing an engraving plate clamp.
Figure 13:
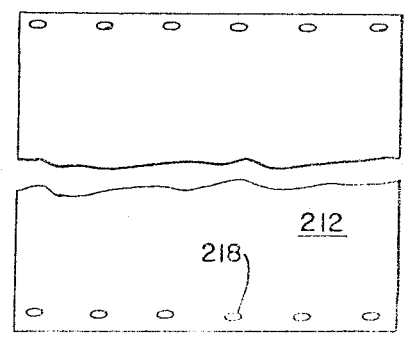
FIG. 13 is a detail of an engraving plate which is clamped on the drum.

As shown in FIG. 12 a preferred form of clamp 210 for an engraving plate 212 as shown in FIG. 13 has parallel bars 214 with fingers 216 with fit into openings 218 in edges of engraving plate 212. The lock 210 is provided with gears 220 at an end of the clamp adjacent the protruding shaft 16 at one end of drum 10. A sector gear 224 is connected to one gear 222, and a worm 226 turns the sector gear and the gears 220 and 222. Bars 214 pivot around pivots 228, and fingers 216 draw and tightly hold the engraving plate 212 around drum 10.

In operation, a piece of work to be copied is securely attached to the scan section 12. A metallic engraving plate is securely attached to the engraving section 14 of the drum 10. The carriage return handle 230 as shown in FIG. 1 is turned to return the carriage so that the cutting head is moved to the left margin of the plate. Loosening the first adjusting means, the scan head is then aligned with the left margin of the work to be copied. The operator selects the scans per inch with control lever 170. If it is necessary to turn the drum, the operator turns crank 232. The operator then selects other operating parameters with controls 240 and turns the machine on. Using the vernier control 64, the operator selects and adjusts the desired path of cut of the cutting head and the engraver is in operation.

While the invention has been described with reference to specific embodiments, modifications and variations of the invention may be made without departing from the scope of the invention which is defined in the following claims.

I claim:

1. A copying apparatus comprising
a base,
a first mounting means for mounting an article which is a subject of a copying process,
a second mounting means for mounting an object to be changed by the copying process,
mounting fixing means for relatively fixing the first and second mounting means,
scanning means mounted adjacent the first mounting means for scanning the article,
changing means mounted adjacent the second mounting means for changing the object,
adjusting means connected to the scanning and changing means for adjusting relative longitudinal and transverse positions of the scanning and changing means,
moving means mounted on the base for moving the first and second mounting means with respect to the scanning and changing means,
stepping means mounted on the base for stepping the scanning and changing means with respect to the first and second mounting means,
elongated guide means mounted on the base and a carriage mounted on the base for moving along the guide means and wherein the scanning means and changing means and adjusting means are mounted on the carriage, and wherein the stepping means is connected to the carriage means and to the base for stepping the carriage means along the guide means.

2. The apparatus of claim 1 wherein the first and second mounting means comprise a drum having means for mounting a photograph which is the subject and having means for mounting an engraving plate which is the object to be changed, and wherein the moving means comprises a motor mounted on the base and connected to the drum for turning the drum with respect to the scanning and changing means.

3. The apparatus of claim 1 wherein the stepping means comprises a lead screw mounted on the base and connected to the carriage means and periodic mans connected to the lead screw for periodically turning the lead screw.

4. The apparatus of claim 3 wherein the first and second mounting means comprise a drum and wherein the moving means comprises a motor mounted on a base and connected to the drum for turning the drum and wherein the periodic means comprises a ratchet means connected to the motor and to the lead screw for periodically turning the lead screw in relation to the turning of the drum.

5. The apparatus of claim 3 wherein the carriage means comprises a body, means for mounting the body on the elongated guide means and split nut means having one half connected to the body and one half remote from the body and means for joining the halves in tight fitting non-backlash relationship with the lead screw.

6. The apparatus of claim 5 wherein the split half nut comprises first and second blocks with complementary semi-cylindrical openings and means for joining the blocks together, the blocks having threads extending through the combined semi-circular openings and having portions of interfaces between the blocks removed after threading and the joining means comprising spring means for urging the blocks together when the blocks are assembled on the lead screw.

7. The apparatus of claim 1 wherein the adjusting means comprises first and second relatively transversely oriented slides mounted on the carriage means and wherein the scanning means and changing means are respectively mounted on the slides for relocatable movement thereon.

8. The apparatus of claim 7 wherein the first slide is mounted parallel to the elongated guide means and wherein the second slide is mounted perpendicular to the elongated guide means.

9. The apparatus of claim 1 wherein the elongated guide means comprise first and second ground round parallel bars mounted on the base and wherein the carriage means comprises three sliders connected to the bars, two sliders being connected to one bar, and one slider being connected to the other bar.

10. The apparatus of claim 9 wherein each of such sliders comprises first and second blocks having complementary semi-cylindrical openings therethrough for together forming a cylindrical opening, means on the first block for connecting the block to a body of the carriage means, the semi-cylindrical openings having recesses therein for receiving slider shoes of friction reducing material having inward projecting concave surfaces complementary to the bars.

11. The apparatus of claim 10 wherein a lower most recess has a spring means mounted between the block and the shoe for urging shoe toward the bar.

12. The apparatus of claim 1 wherein the first and second mounting means comprises a unitary drum having first and second longitudinal halves which respectively comprise the first mounting means and the second mounting means and wherein the first half has means for receiving a photograph which is the subject to be copied and the second half has means for holding an engraving plate which is the object to be changed.

13. The apparatus of claim 12 wherein the means for holding comprises first and second bars having means to engage the plate, pivot means for mounting the bars at a medial portion of the drum, and interconnected gear means at opposite ends of the bars adjacent one end of the drum, a segment means connected to one of the gear means and having teeth at a surface thereof remote from the gear means and worm means mounted on the drum and connected to the teeth for moving the segment means and thereby turning the gear means to move the plate holding means into fixed engagement with the plate whereby the plate is held firmly on the drum.

14. The apparatus of claim 12 further comprising a tooth pulley mounted on a drive shaft of a motor, a second tooth pulley connected to the drum, a tooth drive belt connecting the first and second tooth pulleys, an eccentric mounted on the drive shaft of the motor, an eccentric follower mounted on the eccentric, pawl and ratchet means connected to the eccentric follower, a pawl holdout cam connected to the pawl and ratchet means, and a scan select lever connected to the holdout cam for selectively holding out the cam to control the movement of the stepping means in relation to the rotation of the drum.

15. The apparatus of claim 1 wherein the changing means comprises marking means for marking the object to be changed, a shaft connected to the marking means and a solenoid connected to the shaft for moving the shaft and the marking means toward the object on the second mounting means.

16. The apparatus of claim 15 wherein the marking means is a cutter for engraving the object on the second mounting means.

17. An engraving apparatus having a base, drum supporting means connected to the base, a drum connected to the supporting means, the drum having a photograph holding means and an engraving plate holding means, and elongated guide means mounted on the base parallel to the drum, a carriage mounted on the guide means, a lead screw mounted on the base parallel to the guide means and connected to the carriage for moving the carriage upon turning of the lead screw, a motor mounted on the base and connected to the drum for turning the drum, a ratchet means connected to the motor and connected to the lead screw for stepping the lead screw and carriage upon turning of the drum, a scanning sensor head mounted on the carriage and first adjustment means mounted between the scan sensor head and the carriage for adjusting longitudinal and transverse position of the head, a cutter head mounted on the carriage, second adjusting means mounted between the cutter head and the carriage for selectively moving the cutter head toward the drum, a shaft mounted in the cutter head for reciprocation toward the drum, solenoid means connected to the shaft and the cutter head for driving the shaft toward the drum, and a cutter blade mounted on an end of the shaft adjacent the drum for engraving a plate on the drum when the shaft is moved toward the drum by the solenoid.

18. The apparatus of claim 17 further comprising a stepping adjustment lever connected to the base and to the ratchet means for adjusting the ratchet means to vary the turning of the lead screw and the advancing of the carriage in relation to revolutions of the drum.

19. The apparatus of claim 17 wherein the base comprises first and second opposite end plates and a third plate interconnecting the end plates and wherein the elongated guide means comprises first and second parallel bars interconnecting the end plates and together with the back plate in rigid condition.

20. The apparatus of claim 19 wherein the drum supporting means comprises a shaft and bearings in the first and second plates and wherein the drum is fixed on the shaft, wherein the motor and ratchet means are connected to the first end plate and wherein the lead screw is supported in bearings in the first and second end plates.

21. The apparatus of claim 17 wherein the elongated guide means comprise first and second ground round parallel bars mounted on the base and wherein the carriage comprises three sliders connected to the bars, two sliders being connected to one bar, and one slider being connected to the other bar.

22. The apparatus of claim 21 wherein each of such sliders comprises first and second blocks having complementary semi-cylindrical openings therethrough for together forming a cylindrical opening, means on the first block for connecting the block to a body of the carriage means, the semi-cylindrical openings having recesses therein for receiving slider shoes of friction reducing material having inward projecting concave surfaces complementary to the bars.

23. The apparatus of claim 22 wherein a lower most recess has a spring means mounted between the block and the shoe for urging shoe toward the bar.

24. The apparatus of claim 17 wherein the carriage comprises a body, means for mounting the body on the elongated guide means and split nut means having one half connected to the body and one half remote from the body and means for joining the halves in tight fitting non-backlash relationship with the lead screw.

* * * * *